United States Patent
Sugiura et al.

(10) Patent No.: US 11,954,383 B2
(45) Date of Patent: Apr. 9, 2024

(54) IMAGE PROCESSING DEVICE

(71) Applicant: Konica Minolta, Inc., Tokyo (JP)

(72) Inventors: Hiroshi Sugiura, Toyokawa (JP); Takeshi Hibino, Toyokawa (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 17/964,160

(22) Filed: Oct. 12, 2022

(65) Prior Publication Data
US 2023/0117536 A1 Apr. 20, 2023

(30) Foreign Application Priority Data
Oct. 19, 2021 (JP) .................................. 2021-171229

(51) Int. Cl.
*G06F 3/12* (2006.01)
*H04L 9/40* (2022.01)

(52) U.S. Cl.
CPC .......... *G06F 3/1238* (2013.01); *G06F 3/1222* (2013.01); *G06F 3/1234* (2013.01); *G06F 3/1286* (2013.01); *H04L 63/145* (2013.01)

(58) Field of Classification Search
CPC .... G06F 3/1238; G06F 3/1222; G06F 3/1234; G06F 3/1286; H04L 63/145
See application file for complete search history.

(56) References Cited

U.S. PATENT DOCUMENTS

| | | | |
|---|---|---|---|
| 2012/0195603 A1* | 8/2012 | Nakata | G03G 15/5075 399/8 |
| 2017/0346853 A1* | 11/2017 | Wyatt | H04L 63/1425 |
| 2017/0359306 A1* | 12/2017 | Thomas | H04L 63/145 |
| 2018/0098375 A1* | 4/2018 | Iinuma | H04W 76/19 |
| 2019/0379683 A1* | 12/2019 | Overby | G06N 3/08 |
| 2020/0287929 A1* | 9/2020 | Biever, Jr. | G06F 21/577 |
| 2020/0304341 A1* | 9/2020 | Hayashi | H04L 12/4641 |
| 2020/0304673 A1* | 9/2020 | Sawayanagi | G06F 21/567 |
| 2022/0103576 A1* | 3/2022 | Compton | H04L 41/0631 |

FOREIGN PATENT DOCUMENTS

| | | |
|---|---|---|
| JP | H11073384 A | 3/1999 |
| JP | 2006256104 A | 9/2006 |
| JP | 2007206750 A | 8/2007 |

* cited by examiner

*Primary Examiner* — John R Wallace
(74) *Attorney, Agent, or Firm* — Osha Bergman Watanabe & Burton LLP (57) ABSTRACT

An image processing device includes: a communicator that executes external communication via a communication path; a hardware processor that detects a threat in the image processing device, and cuts off the communication by the communicator upon detecting the threat; a transmitter that executes communication, after the hardware processor detects the threat, to transmit a notification that the threat has been detected to a defined destination via another communication path; and a receiver that executes communication to receive communication restoration trigger information via another communication path. Once the receiver receives the communication restoration trigger information, the hardware processor executes a communication control to restore the communication by the communicator.

12 Claims, 8 Drawing Sheets

Device information

| Device name | IP address | Operation |
|---|---|---|
| AAAA | *.*.*.* | Print |
| BBBB | *.*.*.* | Scan |
| CCCC | *.*.*.* | Print |
| DDDD | *.*.*.* | Print |
| EEEE | *.*.*.* | Scan |

| | |
|---|---|
| Device name | * * * * * |
| Serial number | * * * * * |
| IP address | * * * * * |
| Set location | * * * * * |
| ⋮ | ⋮ |

| Job execution time | Job type | User information | Communication partner information | |
|---|---|---|---|---|
| | | User name | Device name | IP address |
| * * * | Copy | AAAAA | — | — |
| * * * | Print | — | AAAA | *.*.*.* |
| * * * | Scan | BBBBB | — | — |
| * * * | Scan | — | BBBB | *.*.*.* |
| * * * | Print | — | CCCC | *.*.*.* |
| * * * | Print | CCCCC | — | — |
| * * * | Print | — | DDDD | *.*.*.* |
| * * * | Print | DDDDD | — | — |
| * * * | Scan | — | EEEE | *.*.*.* |

…

IMAGE PROCESSING DEVICE

CROSS-REFERENCE TO RELATED APPLICATION

The entire disclosure of Japanese Patent Application No. 2021-171229, filed on Oct. 19, 2021, is incorporated herein by reference.

BACKGROUND

Technical Field

The present disclosure relates to an image processing device that suppresses the spread of security threats such as computer viruses.

Description of Related Art

From the viewpoint of security, multi-function peripherals (MFP) have come to be equipped with virus scanning functions for scanning internal software and data. MFPs are often connected to other MFPs or terminals via networks, and therefore there is a risk that a virus will spread from one MFP. In order to prevent the spread of such security threats, an MPF has been disclosed that cuts off connection to a network when a virus is detected (JP 2007-206750).

An MFP shared by multiple users is generally set up by an administrator, and recovery from a network cut off is performed by the administrator.

In recent years, remote work has become widespread, and it may be considered that the administrator is not always near an MFP, and may be distant from the place the MFP is installed.

When connection of an MFP to a network is cut off in such a remote work environment, it may take some time to restore connection to the network, and the MFP cannot be used for the duration.

This would occur also in image processing devices other than MFPs, such as printers and scanners having network functions.

SUMMARY

One or more embodiments of the present disclosure provide an image processing device capable of restoring a network connection at an appropriate timing even in a situation of remote work where the administrator is not nearby, after the network connection is cut off due to detection of a security risk such as a virus.

An image processing device according to an aspect of the present disclosure comprises: a communicator (i.e., network communicator) that communicates externally; a hardware processor that executes threat detection to detect a threat (e.g., virus) in the image processing device, and cuts off communication by the communicator when a threat is detected; a transmitter (i.e., telephone line communicator or Bluetooth communicator) that, when a threat is detected, transmits a notification that a threat has been detected to a defined destination, by a different communication path to that used by the communicator; and a receiver (i.e., telephone line communicator or Bluetooth communicator) that receives communication restoration trigger information (or network recovery trigger information) by a different communication path to that used by the communicator, wherein the hardware processor, upon reception of the communication restoration trigger information by the receiver, executes a communication control to restore communication by the communicator.

BRIEF DESCRIPTION OF DRAWINGS

The advantages and features provided by one or more embodiments of the invention will become more fully understood from the detailed description given hereinbelow and the appended drawings which are given by way of illustration only, and thus are not intended as a definition of the limits of the invention. In the drawings.

DETAILED DESCRIPTION

Hereinafter, embodiments of the present invention will be described with reference to the drawings. However, the scope of the invention is not limited to the disclosed embodiments.

The following describes an image processing device 11 according to one or more embodiments, with reference to the drawings.

[1] Configuration of Image Processing Device 11 and Peripheral Systems

Figure 1:
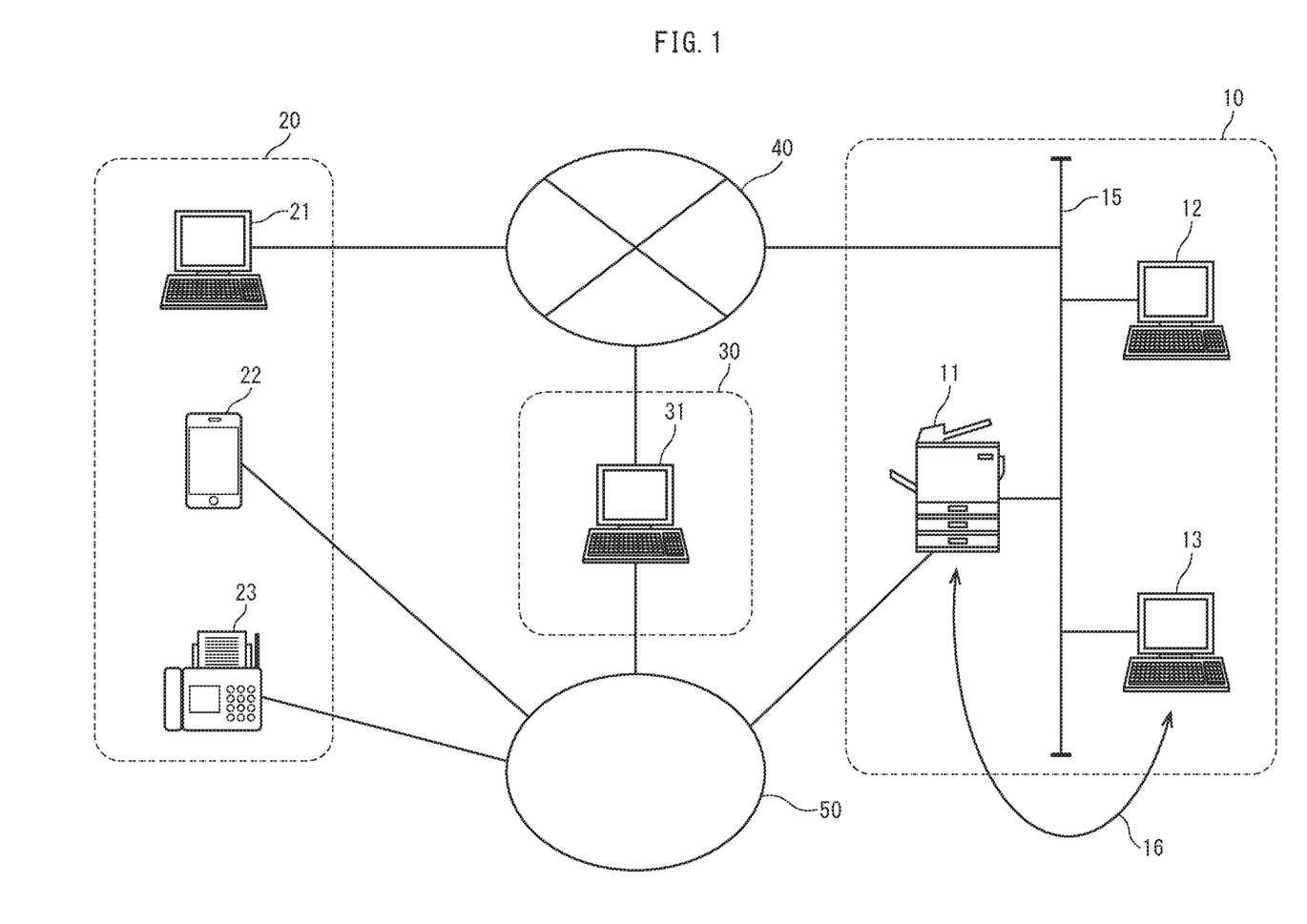
FIG. 1 illustrates an example configuration of an image processing device 11 and peripheral systems.

FIG. 1 illustrates an example configuration of the image processing device 11 according to one or more embodiments, and peripheral systems.

The image processing device 11, an information processing terminal 12, and an information processing terminal 13 are installed around a base point 10. The image processing device 11, the information processing terminal 12, and the information processing terminal 13 are each connected via a network 15. Further, the image processing device 11 and the information processing terminal 13 are connected via a network 16, the image processing device 11 is connected to a telephone line 50, and the network 15 is connected to an external network 40.

The network 15 may be, for example, a local area network (LAN) using a wired Ethernet (registered trademark) cable or a wireless communication network. The network 15 can connect various devices using, for example, the TCP/IP protocols, to exchange various types of data.

The network 16 is a Bluetooth (registered trademark) standard wireless communication network, by which various types of data can be exchanged between connected terminals according to corresponding profiles.

The external network is the Internet, which connects terminals between remote base points to enable exchange of various types of data.

The telephone line 50 can exchange various types of data such as audio (telephone), visual (facsimile), and text (short message service) between devices connected to the telephone line 50, and is an information transmission path using a different path to that of the external network 40.

The image processing device 11 is an MFP that has copying, printing, facsimile, and scanning functions. Further, the image processing device 11 has a network function of connecting to the network 15, and can exchange information with the information processing terminals 12, 13 connected to the network 15. For example, the image processing device 11 receives a print instruction from the information processing terminals 12, 13, and executes a print job according to the print instruction received. Further, for example, the image processing device 11 designates the information processing terminals 12, 13 connected to the network 15 as destinations for a scan, and transmits image data that results from scanning a document to the designated destinations.

The information processing terminals 12, 13 are personal computers (PC) capable of instructing the image processing device 11 to print and designating destinations for scans.

The image processing device 11 and the information processing terminal 13 have Bluetooth communication functions, and can exchange dedicated commands not only via the network 15, but also by the network 16.

An information processing terminal 21, a mobile terminal 22, and a facsimile device 23 are installed at a base point 20 where remote work is performed, such as at an administrator's home.

The information processing terminal 21 is connected to the external network 40, and can exchange various types of data with the image processing device 11 and the information processing terminals 12, 13 via the external network 40 and the network 15. Further, the information processing terminal 13 has a remote desktop server function, the information processing terminal 21 has a remote desktop client function, and the information processing terminal 13 can be remotely operated from the information processing terminal 21.

The mobile terminal 22 is connected to the telephone line 50 and can receive text data by a short message service from the image processing device 11.

The facsimile device 23 is connected to the telephone line 50 and can receive image data from the image processing device 11 by facsimile communication.

An information processing terminal 31 is installed at a base point 30 of a service engineer who carries out maintenance and management of the image processing device 11. The information processing terminal 31 is connected to the external network 40, and can exchange various types of data with the image processing device 11 via the external network 40 and the network 15. Further, the information processing terminal 31 is connected to the telephone line 50, and can exchange various types of data with the image processing device 11 via the telephone line 50. Accordingly, the information processing terminal 31 can communicate with the image processing device 11 by a dedicated command when trouble occurs or a consumable is replaced, and status of the image processing device 11 can be checked via a command of the information processing terminal 31.

[2] Configuration of Image Processing Device 11 and Peripheral Systems

Figure 2:
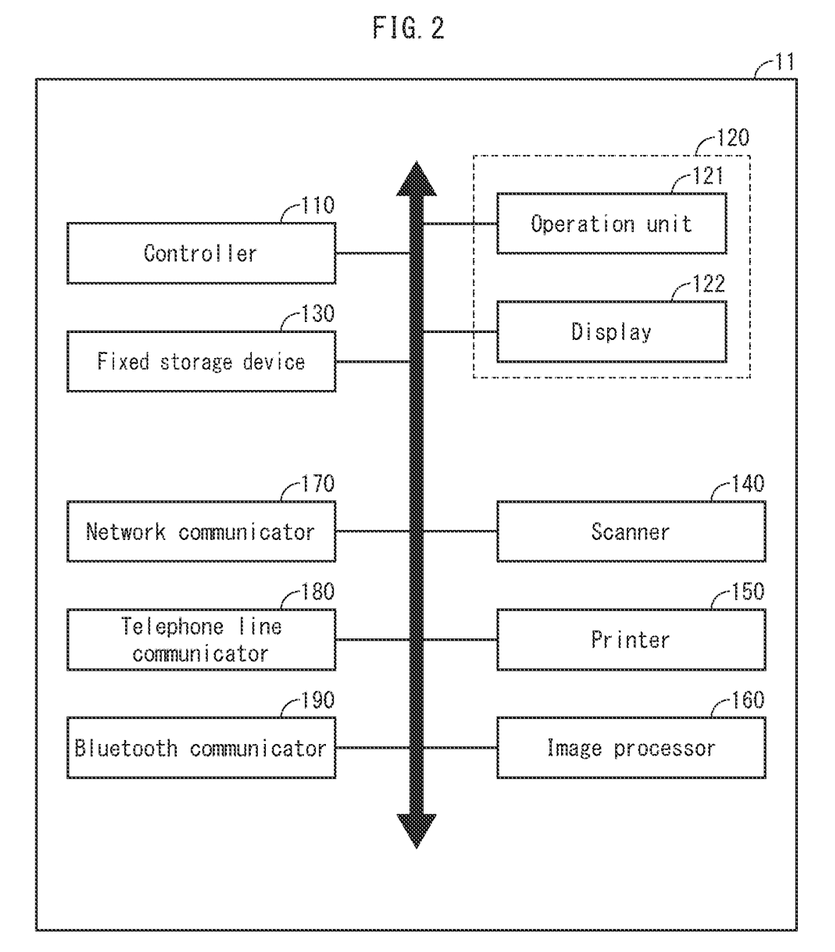
FIG. 2 is a block diagram illustrating functions of the image processing device 11.

FIG. 2 is a block diagram illustrating functions of the image processing device 11. The image processing device 11 includes a controller (or hardware processor) 110, an operation panel 120, a fixed storage device 130, a scanner 140, a printer 150, an image processor 160, a network communicator 170, a telephone line communicator 180, and a Bluetooth communicator 190.

The controller 110 includes a central processing unit (CPU), random access memory (RAM), read-only memory (ROM), and the like. The CPU controls operations of the image processing device 11 by loading a control program stored in the ROM into RAM and executing the control program. The controller 110 controls functions of copying, printing, facsimile transmission, and scanning, by executing a control program, for example. Further, the controller 110 realizes a virus scan function for executing a virus scan, a virus removal function for removing a virus, and a communication control function for cutting off communication with the network 15 and controlling recovery from being cut off.

The operation panel 120 includes a display 122 for displaying information and an operation unit 121 for receiving various operations. The display 122 includes a liquid crystal display or the like, and displays screens such an operation screen, a settings screen, a confirmation screen, and a notification screen. The operation unit 121 includes, for example, various buttons such as a mode selection key for selecting an operation mode (copy mode for copying, scan mode for scanning, etc.), a start key for job execution, a stop key for stopping job execution, and a number pad for numerical input, and a touch panel provided to a surface of the display 122 that receives various operations performed by a user on the image forming device 11.

The fixed storage device 130 is, for example, a semiconductor memory or a hard disk device that retains storage even when a power supply is turned off, and stores data such as display data of screens displayed on the display 122. The administrator's facsimile address (facsimile number of the facsimile device 23) and short message address (telephone number of the mobile terminal 22) are also stored.

Further, the fixed storage device 130 stores image data acquired by scanning a document in scanning or copying, print data (image data) included in a print job received from the image processing terminals 12, 13, and facsimile data (image data) received via the telephone line 50. Further, the fixed storage device 130 stores a virus definition file used for virus scan processing and a virus detection history generated as a result of virus scan processing.

Further, the fixed storage device 130 stores device information 801 indicating device-specific information of the image forming device 11, settings set for the image forming device 11, and job history information 802 indicating job execution history of copying, printing, and scanning executed by the image processing device 11.

Figure 8A:
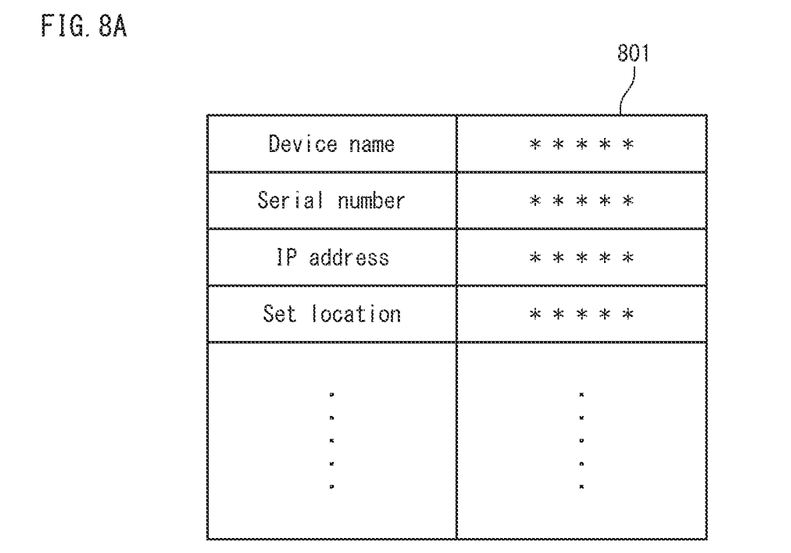
FIG. 8A illustrates an example of device information 801 stored in a fixed storage device 130.

FIG. 8A illustrates an example of the device information 801. As illustrated, the device information 801 includes a set location, IP address, serial number, and device name of the image processing device 11.

Figure 8B:
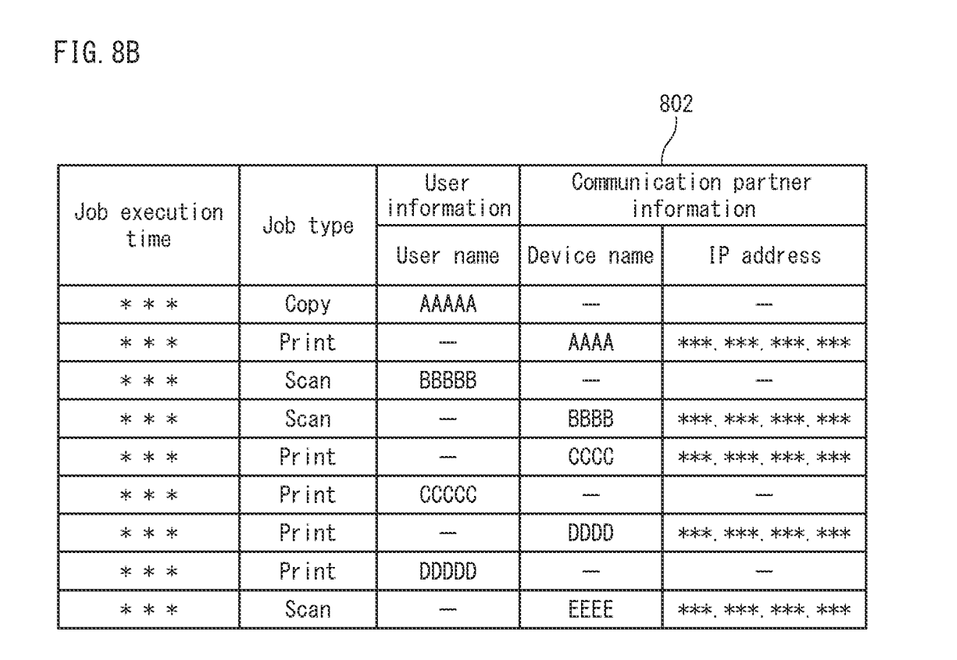
FIG. 8B illustrates an example of job history information 802 stored in the fixed storage device 130.

FIG. 8B illustrates an example of the job history information 802. As illustrated, the job history information 802 includes a job identifier (copy, print, scan) and an execution time. Further, the job history information 802 includes a username when a job executed by the image processing device 11 is executed due to a user operating (the operation panel 120 of) the image processing device 11. The username is specified by comparing authentication information input by a user with verification information stored in the image processing device 11. Further, the job history information 802 includes a device name and IP address of a communication partner when communication occurs with an external device in execution of a job.

Returning to FIG. 2, the scanner 140 includes a platen (not illustrated), and optically scans a document placed on the platen to acquire image data. The scanner 140, for example, includes a light source that irradiates a document with light, a line image sensor that receives reflected light to scan the document line by line in a width direction, a movement unit that sequentially moves a scanning position in a length direction of the document line by line, an optical path consisting of a lens, mirror, or the like that guides reflected light from the document to the line image sensor, and a conversion unit that converts an analog image signal output by the line image sensor into digital image data.

The printer 150 forms and outputs an image on a sheet according to an electrophotographic process based on image data. The printer 150 is, for example, a laser printer including a sheet conveyance device, a photoconductor drum, a charging device, a laser diode (LD) the lighting of which is controlled according to input image data, a scanning unit for scanning a laser beam emitted from the LD across the photoconductor drum, a developing device, a transfer separation device, a cleaning device, and a fixing device. Instead of the laser beam, a light emitting diode (LED) printer that irradiates the photoconductor drum with an LED or another type of printer may be used.

The image processor 160 executes rasterization processing on print data (vector format print data) received from the information processing terminals 12, 13, and image processing of image data such as image correction, rotation, enlargement, reduction, compression, and expansion.

The network communicator 170 is a network interface that can connect to the network 15, and communicates with (or executes external communication with) external devices such as the information processing terminals 12, 13 via the network 15. For example, the network communicator 170 receives image data as a print job and transmits image data as a scan job.

The telephone line communicator 180 (or telephone line interface) transmits and receives image data via the facsimile device 23 having a facsimile function and the telephone line 50. Further, the telephone line communicator 180 may function as either or both of a transmitter that executes communication, after the controller 110 detects the threat, to transmit a notification that the threat has been detected to a defined destination via another communication path different from the communication path used by the network communicator 170, and a receiver that executes communication to receive communication restoration trigger information via another communication path different from the communication path used by the network communicator 170. The telephone line communicator 180 can transmit and receive short messages to and from the mobile terminal 22. Further, the telephone line communicator 180 can transmit and receive dedicated commands to and from the information processing terminal 31 of the service engineer at timings such as when trouble occurs or consumables are to be replaced.

The Bluetooth communicator 190 (or Bluetooth interface) may function as either or both of the transmitter and receiver described above. The Bluetooth communicator 190 can transmit and receive dedicated commands to and from an external device having a Bluetooth function via the network 16.

[3] Operations of Image Processing Device 11

Figure 3:
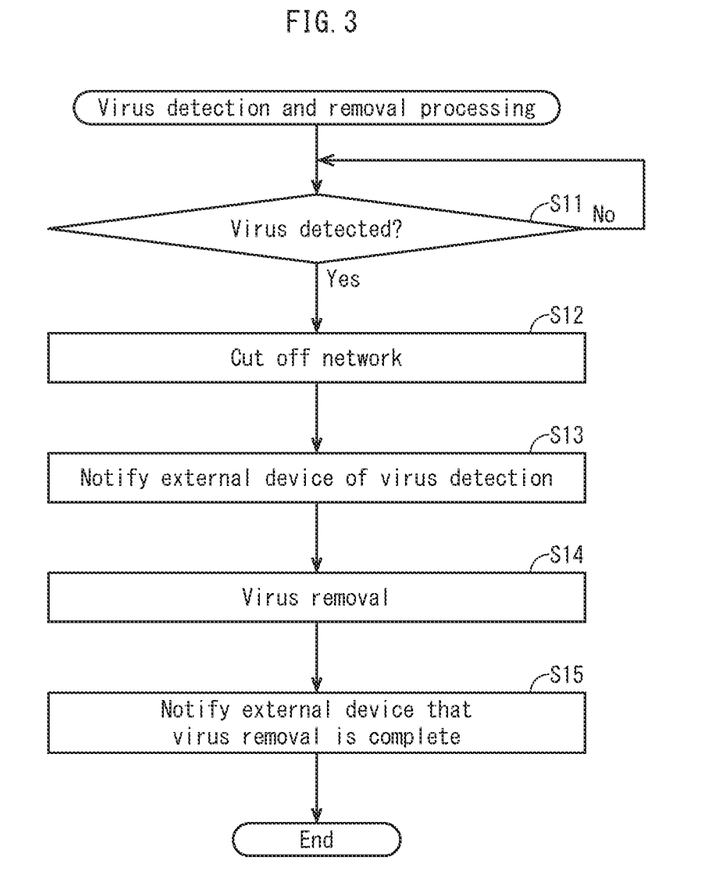
FIG. 3 is a flowchart illustrating virus detection and removal processing performed by the image processing device 11.

FIG. 3 illustrates a processing flow for virus detection and removal performed by the image processing device 11.

The image processing device 11 has a virus scan function such that, when receiving a print job from the information processing terminals 12, 13, when sending a scan job to the information processing terminals 12, 13, and at a timing set by the administrator, a virus scan is executed to scan received image data, image data to be transmitted, or data stored in the fixed storage device 130 (step S11).

If a virus is detected in step S11, communication via the network 15 is cut off to prevent the spread of virus infection (step S12). Cutting off communication via the network 15 can be achieved by disabling a network interface card (NIC) of the network communicator 170 to realize a state that is the same as when connection of layer 1 (physical layer) is cut off, or by stopping packet transmission by the network communicator 170.

Next a defined external device is notified that a virus has been detected via a telephone line (step S13).

Figure 5:
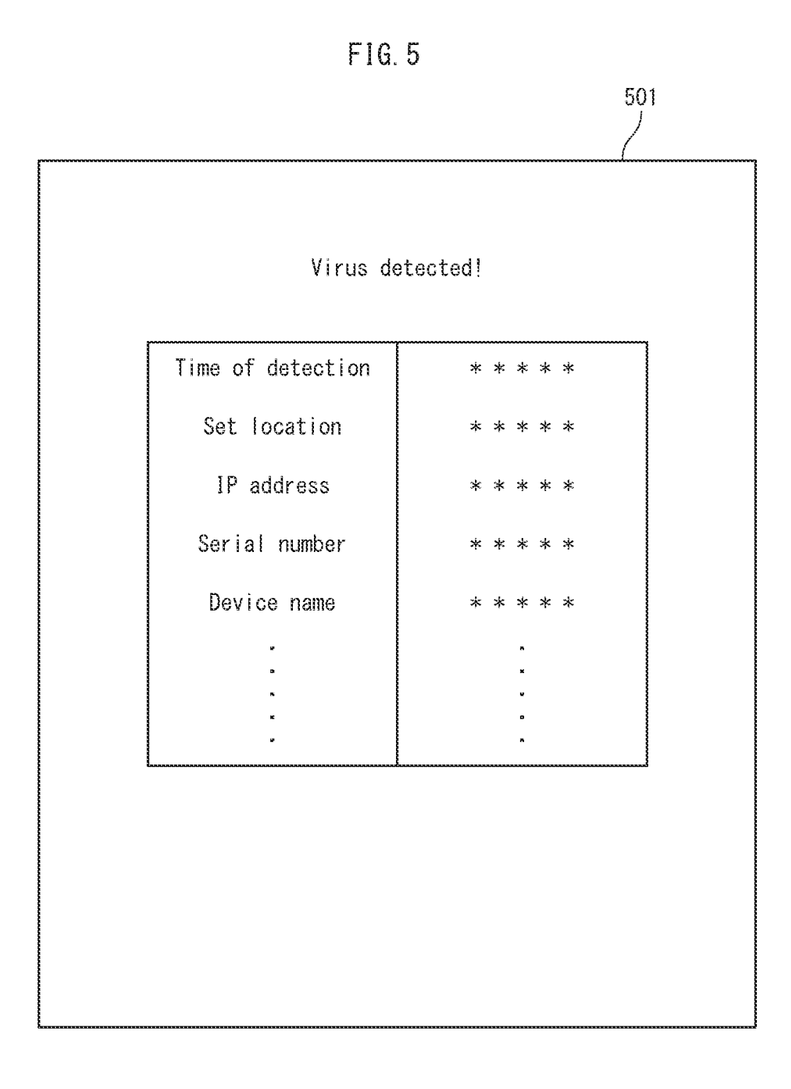
FIG. 5 illustrates an example of a facsimile document indicating that a virus has been detected.

As an example of virus detection notification, a facsimile (image data) 501 is generated, an example of which is illustrated in FIG. 5, based on the device information 801 stored in the fixed storage device 130, and the facsimile 501 is transmitted to the facsimile device 23 of the administrator by facsimile communication.

Further, text data may be generated having the same content as the facsimile 501 and transmitted as a short message to the mobile terminal 22 of the administrator.

Further, a dedicated command indicating that a virus has been detected may be transmitted to the information terminal 31 of the service engineer, and the service engineer may notify the administrator by some means (telephone, facsimile, email, etc.) Device information may be included in the notification to the service engineer, but it may be assumed that the service engineer holds device information in advance. In any case, the administrator is notified in a way that indicates which device detected a virus.

In step S13, the administrator may be further notified of information regarding a user of the image processing device 11.

Figure 6:
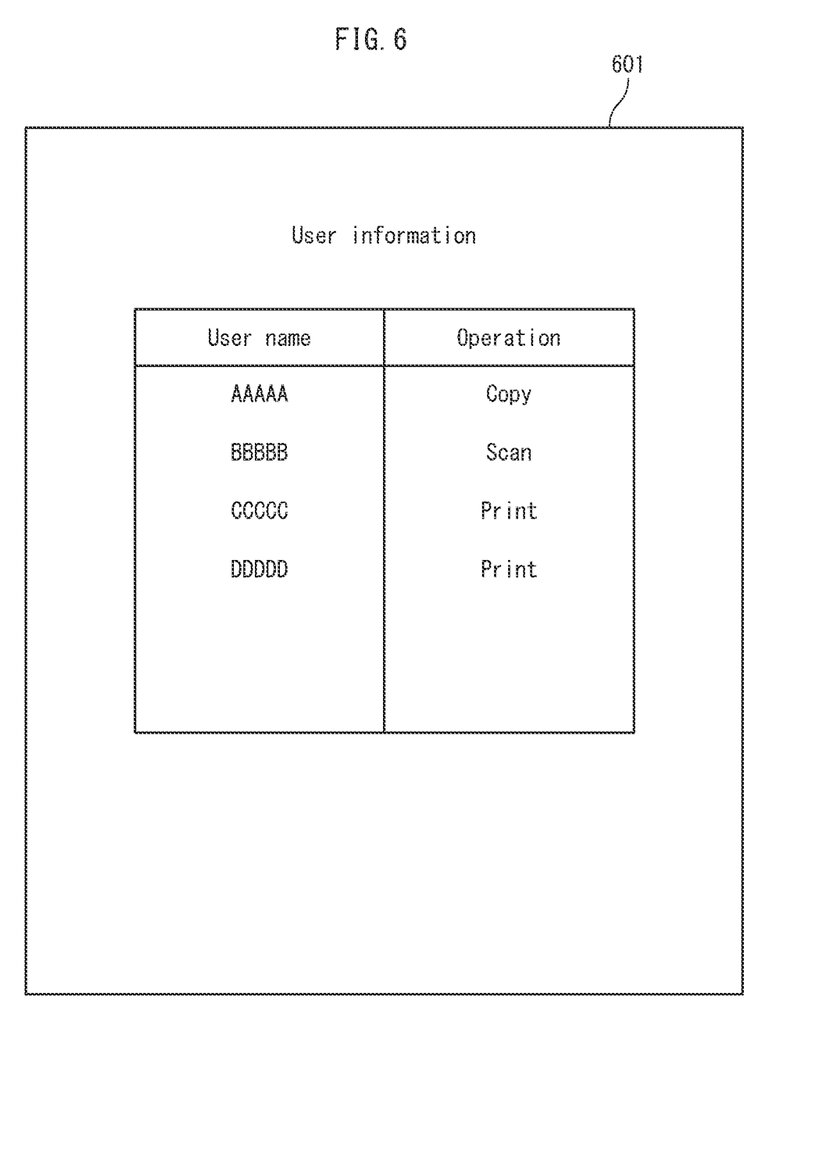
FIG. 6 illustrates an example of a facsimile notification of users who have operated the image processing device 11 during a defined period before virus detection.

As an example of notification of user information, a facsimile (image data) 601 is generated, based on the job history information 802 stored in the fixed storage device 130, and the facsimile 601 is transmitted to the facsimile device 23 of the administrator by facsimile communication.

FIG. 6 illustrates an example of the facsimile 601 that describes user information with respect to the image processing device 11 that has detected a virus. As illustrated, information is described for users who operated the image processing device 11 prior to detection of the virus for a defined period. By transmitting this information to the administrator, the administrator can instruct a user who may have a device infected with the virus to check their device for the virus. This makes it possible to instruct the image processing device 11 to end a network cutoff (network recovery) after confirming that devices around the image processing device 11 are free from virus infection.

In step S13, the administrator may be further notified of information regarding any device that communicated with the image processing device 11.

Figure 7:
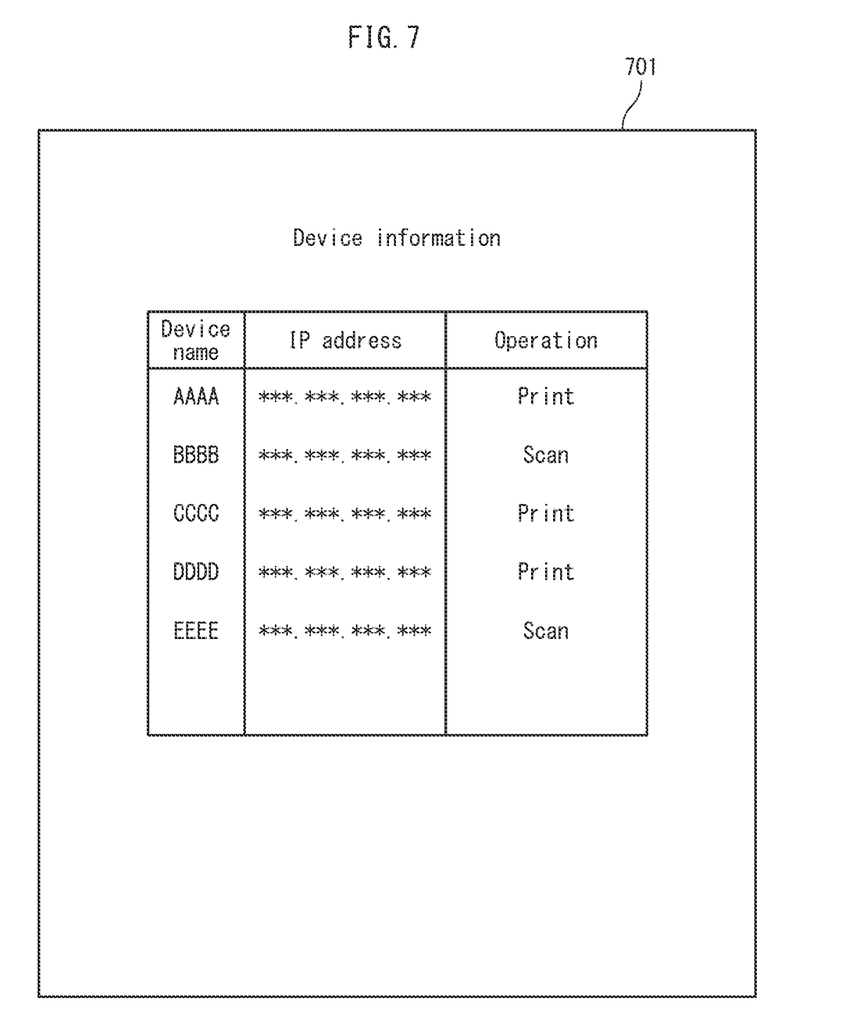
FIG. 7 illustrates an example of a facsimile notification of devices that have communicated with the image processing device 11 during a defined period before virus detection.

As an example of notification of devices that communicated, a facsimile (image data) 701 is generated by extracting information of jobs that involved communication with the image processing device 11 from the job history information 802 stored in the fixed storage device 130, and the facsimile 701 is transmitted to the facsimile device 23 of the administrator by facsimile communication.

FIG. 7 illustrates an example of the facsimile 701 that describes information of devices that communicated with the image processing device 11 that has detected a virus. As illustrated, device information (device name, IP address) is described for devices that communicated during a defined time prior to virus detection. By transmitting this information to the administrator, the administrator can, from device information of devices that may be infected with the virus, instruct a user who has such a device to check their device for the virus. This makes it possible to instruct the image processing device 11 to end a network cutoff (network recovery) after confirming that devices around the image processing device 11 are free from virus infection.

After notification in step S13, the image processing device 11 executes virus removal (step S14), and after virus removal is completed, notifies defined external devices (mobile terminal 22, facsimile device 23, information processing terminal 31) that virus removal is complete via the telephone line 50, which is a different communication path than communication using the network communicator 170 (step S15).

Figure 4:
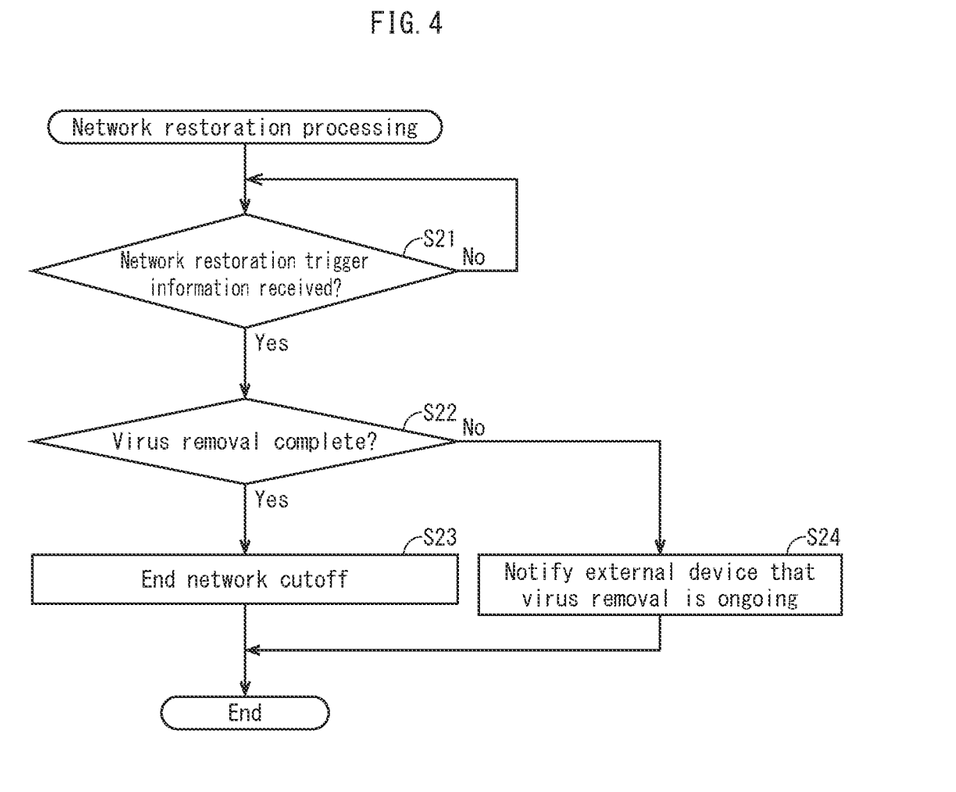
FIG. 4 is a flowchart illustrating network restoration processing by the image processing device 11.

FIG. 4 illustrates a processing flow of ending network cutoff (network recovery) by the image processing device 11.

After the network is cut off, the image processing device 11 waits for network recovery trigger information from an external device (step S21). When the network recovery trigger information is received (step S21: "Yes"), the image processing device 11 checks whether virus removal is complete (step S22). If virus removal is complete (step S22: "Yes"), the network is recovered (cut off state ended) (step S23). Recovery of communication via the network 15 is realized by enabling the NIC or restarting packet transmission.

If virus removal is not complete (step S22: "No"), an external device (for example, mobile terminal 22, facsimile device 23, information processing terminal 31) is notified via telephone line that the virus is being removed (step S24).

An example of receiving the network recovery trigger information is reception of a facsimile sent by the administrator (the facsimile device 23). When the sender of a received facsimile is the administrator, it may be considered that the network recovery trigger information has been received regardless of the content of the fax document.

Another example of receiving the network recovery trigger information is reception of a short message sent by the administrator (mobile terminal 22). In this case also, when the sender of a received short message is the administrator, it may be considered that the network recovery trigger information has been received regardless of the content of the short message.

Another example of receiving the network recovery trigger information is reception of a network recovery command from the information processing terminal 31 of the service engineer. In this case, it is assumed that the administrator has requested recovery by the service engineer by some means.

Further, another example of receiving the network recovery trigger information is reception of a recovery command on the network 16 from the information processing terminal 13 equipped with a Bluetooth function. In this case, the administrator accesses the information processing terminal 13 equipped with a Bluetooth function near the image processing device 11 by using a remote desktop function or the like, and gives an instruction via the information processing terminal 13 for the image processing device 11 to restore network access. In any case, the network recovery trigger information is received by a communication path different from the communication path via the network communicator 170.

By operating according to the above processing flow, the image processing device 11 notifies a defined destination (for example, the administrator or service engineer) that a threat (e.g., virus) has been detected or transmits a notification that the threat has been detected to the defined destination, and after the network recovery trigger information instructing network recovery is received, restores network access. The administrator confirms an infection status of the virus in the image processing device 11 and the information processing terminals 12, 13, and after the virus is removed from the image processing device 11 and an uninfected state is confirmed for the information processing terminals 12, 13, transmitting the network recovery trigger information to the image processing device 11 causes restoration of network access to the image processing device 11 at an appropriate timing even if the administrator is not near the image processing device 11.

[4] Other Modifications

Although the present disclosure describes the embodiments above, the present disclosure is of course not limited to the embodiments above, and includes the following modifications.

(1) According to the embodiments described above, the image processing device 11 is an MFP, but may be an image processing device other than an MFP, such as a printer or scanner. Aside from an image processing device, the present disclosure may be embodied as an information processing device shared by a plurality of people, such as a server device, and set by an administrator.

(2) According to the embodiments described above, the image processing device 11 notifies the administrator and/or the service engineer of virus infection by communication via the telephone line communicator 180. Here, communication via telephone line by the telephone line communicator 180 is an example of communication in which the risk of virus spread is smaller than communication via the network communicator 170, but as long as communication is used for which the risk of virus spread is small, the present disclosure is not limited to this example. For example, a dedicated communication path may be provided between the image processing device 11 and the information processing terminal 21 of the administrator or the information processing terminal 31 of the service engineer, and notification may be achieved by a dedicated command using the dedicated communication path.

(3) According to the embodiments described above, the image processing device 11 receives the network recovery trigger information from the administrator or the service engineer by communication via the telephone line communicator 180 or by communication via the Bluetooth communicator 190. Here, communication via telephone line by the telephone line communicator 180 or the Bluetooth communicator 190 is an example of communication in which the risk of virus spread is smaller than communication via the network communicator 170, but as long as communication is used for which the risk of virus spread is small, the present disclosure is not limited to this example. For example, a dedicated communication path may be provided between the image processing device 11 and the information processing terminal 21 of the administrator or the information processing terminal 31 of the service engineer, and notification may be achieved by a dedicated command using the dedicated communication path.

(4) The present disclosure may be embodied as a combination of the embodiments and modifications described above.

[Review]

An image processing device according to an aspect of the present disclosure comprises: a communicator that communicates externally; a hardware processor that executes threat detection to detect a threat in the image processing device, and cuts off communication by the communicator when a threat is detected; a transmitter that, when a threat is detected, transmits a notification that a threat has been detected to a defined destination, by a different communication path to that used by the communicator; and a receiver that receives communication restoration trigger information by a different communication path to that used by the communicator, wherein the hardware processor, upon reception of the communication restoration trigger information by the receiver, executes a communication control to restore communication by the communicator.

Further, according to at least one embodiment, the communicator executes communication via a local area network (LAN), and the transmitter executes communication via a telephone line.

Further, according to at least one embodiment, the transmitter transmits the notification by facsimile communication to a facsimile receiver used by an administrator of the image processing device.

Further, according to at least one embodiment, the transmitter transmits the notification by a short message service to a mobile terminal used by an administrator of the image processing device.

Further, according to at least one embodiment, the transmitter transmits a command as the notification to an information processing terminal used by a service engineer who performs maintenance management work on the image processing device.

Further, according to at least one embodiment, the communicator executes communication via a local area network (LAN), and the receiver executes communication via a telephone line.

Further, according to at least one embodiment, the receiver receives a facsimile sent from a facsimile transmitter used by an administrator of the image processing device as the communication restoration trigger information.

Further, according to at least one embodiment, the receiver receives a short message from a mobile terminal used by an administrator of the image processing device as the communication restoration trigger information.

Further, according to at least one embodiment, the receiver receives a command to restore from an information processing terminal used by a service engineer who performs maintenance management work on the image processing device as the communication restoration trigger information.

Further, according to at least one embodiment, the communicator executes communication via a local area network (LAN), and the receiver communicates via short range wireless communication.

Further, according to at least one embodiment, the receiver receives a command to restore from a terminal equipped with a short range wireless communication function as the communication restoration trigger information.

Further, according to at least one embodiment, the hardware processor has a function of eliminating a detected threat, and the transmitter notifies the defined destination that the threat has been eliminated after the threat detected by the hardware processor has been eliminated.

Further, according to at least one embodiment, the transmitter also transmits to the defined destination information including users who operated the image processing device during a defined period prior to the detection of the threat.

Further, according to at least one embodiment, the transmitter also transmits to the defined destination information including devices that communicated with the image processing device during a defined period prior to the detection of the trouble.

According to one or more embodiments of the present disclosure, network recovery is achieved by notifying a defined destination (for example, an administrator) that a threat has been detected and receiving the communication restoration trigger information (or network recovery trigger information) instructing network restoration. The administrator can check virus infection status of MFPs and other terminals, and send the communication restoration trigger information at an appropriate timing, such as after a virus had been eliminated, and in this way, the network can be restored remotely.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An image processing device comprising:
    a communicator that executes external communication via a communication path;
    a hardware processor that detects a virus by executing a virus scan within the image processing device, and cuts off the communication by the communicator upon detecting the virus;
    a transmitter that executes communication, after the hardware processor detects the virus, to transmit a notification that the virus has been detected to a defined destination via another communication path; and
    a receiver that executes communication to receive communication restoration trigger information via another communication path, wherein
    once the receiver receives the communication restoration trigger information, the hardware processor executes a communication control to restore the communication by the communicator,
    the communicator executes the communication via a local area network (LAN),
    the transmitter executes the communication via a telephone line, and
    the transmitter executes facsimile communication to transmit the notification to a facsimile receiver used by an administrator of the image processing device.

2. The image processing device of claim 1, wherein the transmitter transmits the notification by a short message service to a mobile terminal used by an administrator of the image processing device.

3. The image processing device of claim 1, wherein the communicator executes the communication via a local area network (LAN), and the receiver executes the communication via a telephone line.

4. The image processing device of claim 3, wherein the receiver receives a short message as the communication restoration trigger information from a mobile terminal used by an administrator of the image processing device.

5. The image processing device of claim 3, wherein
the receiver receives a recovery command as the communication restoration trigger information from an information processing terminal used by a service engineer to perform a maintenance management work on the image processing device.

6. The image processing device of claim 1, wherein
the communicator executes the communication via a local area network (LAN), and
the receiver executes the communication via short range wireless communication.

7. The image processing device of claim 6, wherein
the receiver receives a recovery command as the communication restoration trigger information from a terminal equipped with a short range wireless communication function.

8. The image processing device of claim 1, wherein
the hardware processor has a function of eliminating the detected virus, and
the transmitter notifies the defined destination that the virus has been eliminated after the virus detected by the hardware processor has been eliminated.

9. The image processing device of claim 1, wherein
the transmitter also transmits, to the defined destination, information on a user operating the image processing device during a defined period prior to the detection of the virus.

10. The image processing device of claim 1, wherein
the transmitter also transmits, to the defined destination, information on a device communicating with the image processing device during a defined period prior to the detection of the virus.

11. An image processing device comprising:
a communicator that executes external communication via a communication path;
a hardware processor that detects a virus by executing a virus scan within the image processing device, and cuts off the communication by the communicator upon detecting the virus;
a transmitter that executes communication, after the hardware processor detects the virus, to transmit a notification that the virus has been detected to a defined destination via another communication path; and
a receiver that executes communication to receive communication restoration trigger information via another communication path, wherein
once the receiver receives the communication restoration trigger information, the hardware processor executes a communication control to restore the communication by the communicator,
the communicator executes the communication via a local area network (LAN),
the transmitter executes the communication via a telephone line, and
the transmitter transmits a command as the notification to an information processing terminal used by a service engineer to perform a maintenance management work on the image processing device.

12. An image processing device comprising:
a communicator that executes external communication via a communication path;
a hardware processor that detects a virus by executing a virus scan within the image processing device, and cuts off the communication by the communicator upon detecting the virus;
a transmitter that executes communication, after the hardware processor detects the virus, to transmit a notification that the virus has been detected to a defined destination via another communication path; and
a receiver that executes communication to receive communication restoration trigger information via another communication path, wherein
once the receiver receives the communication restoration trigger information, the hardware processor executes a communication control to restore the communication by the communicator,
the communicator executes the communication via a local area network (LAN),
the receiver executes the communication via a telephone line, and
the receiver receives a facsimile as the communication restoration trigger information from a facsimile transmitter used by an administrator of the image processing device.

* * * * *